Jan. 12, 1932.    T. W. MURPHY ET AL    1,841,140
FLUID CONTROL DEVICE
Filed Dec. 2, 1929    2 Sheets-Sheet 1
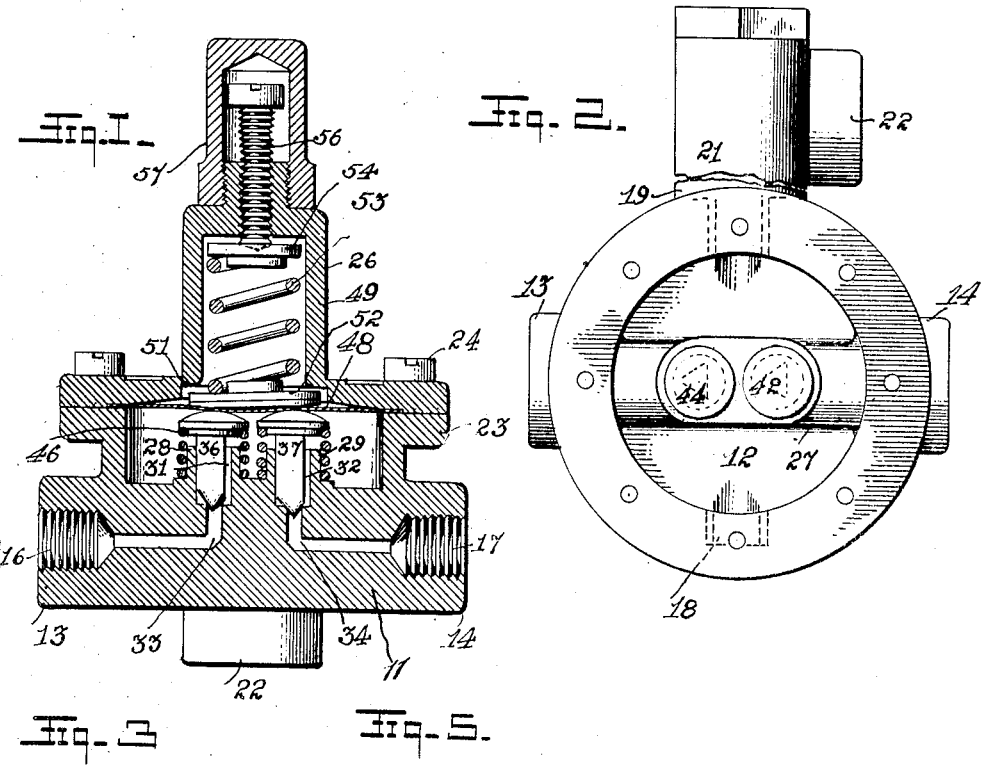
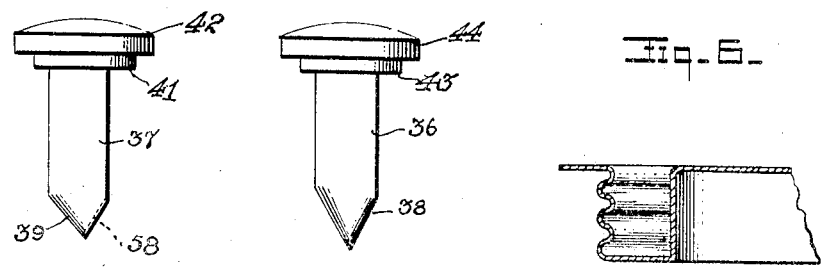
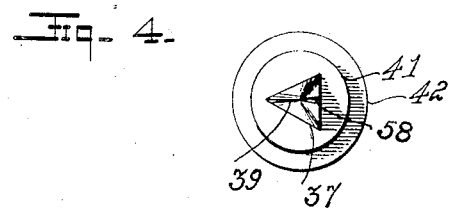
WITNESS:
INVENTORS:
Thomas W. Murphy
Wladyslaw Czarnecki
BY
Joshua R H Notts
ATTORNEY

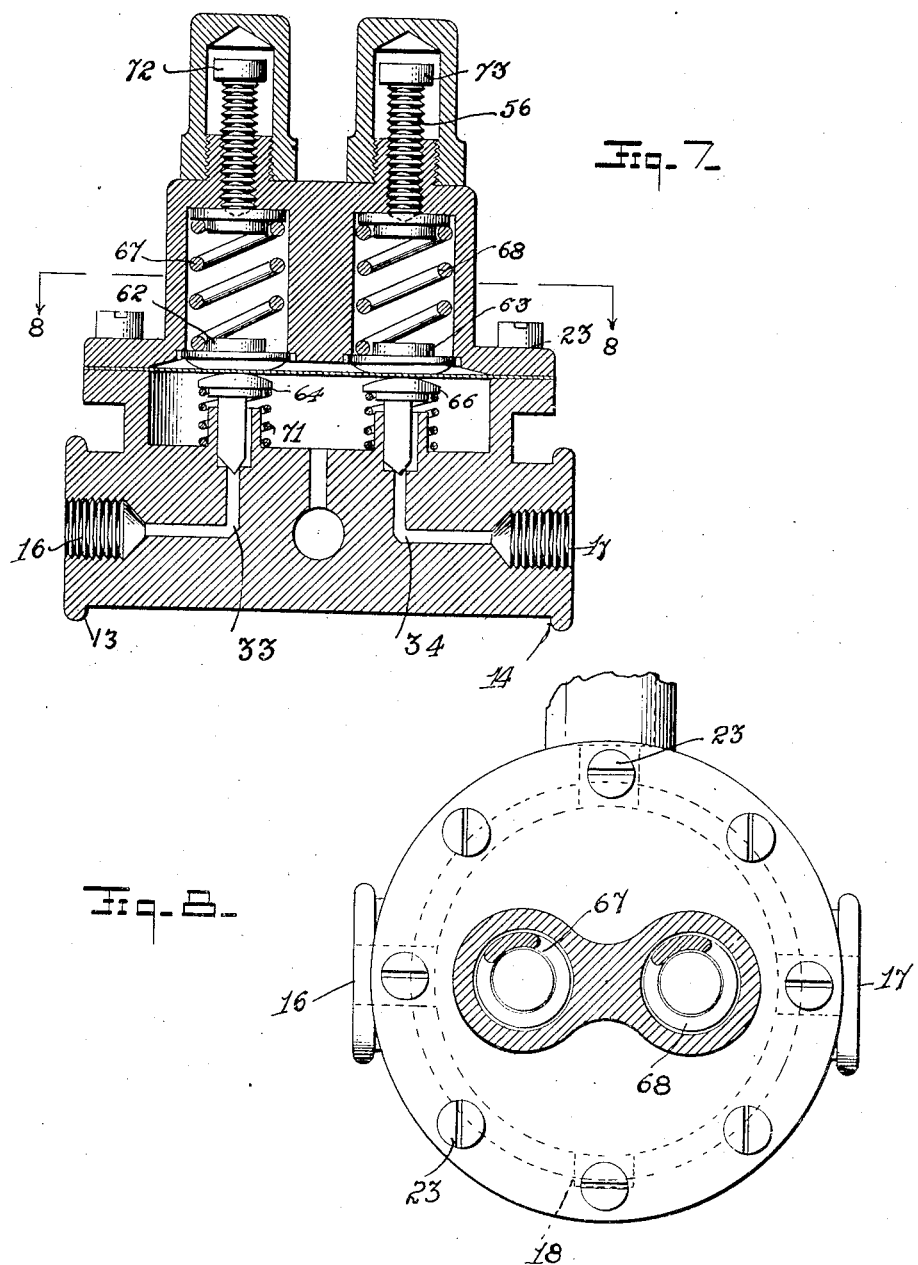

Patented Jan. 12, 1932

1,841,140

UNITED STATES PATENT OFFICE.

THOMAS W. MURPHY, OF CAMDEN, NEW JERSEY, AND WLADYSLAW CZARNECKI, OF EDDINGTON, PENNSYLVANIA, ASSIGNORS TO MONARCH MANUFACTURING WORKS, INC., OF PHILADELPHIA, PENNSYLVANIA, A CORPORATION OF DELAWARE

FLUID CONTROL DEVICE

Application filed December 2, 1929. Serial No. 411,176.

This invention relates to fluid control devices and has particular reference to the type of oil control valves for oil burners and the like.

The object of the invention is to provide an improved fluid control device.

A further object of the invention is to provide a fluid control device which is provided with a valve controlling a port leading to a consuming device and a valve controlling an overflow port wherein both valves are located in the same chamber and operated by the same mechanism.

It therefore follows that another important object of this invention is to provide a fluid control device which may be economically manufactured and assembled and which will have fewer parts, thereby minimizing the trouble factor.

According to the invention the fluid control device comprises a body having a pressure chamber within the same, an inlet port through which fluid under pressure is supplied to the chamber, an outlet port and a by-pass port for returning excess liquid, a valve in the inlet port and a valve in the by-pass port, each valve having a stem, means for urging said valves into a position to open said ports, a diaphragm beyond said valves, pressure means for holding said diaphragm against said valve stems to keep the valves closed when the pressure in the chamber is below a predetermined amount and adapted to be overcome by the pressure in the chamber whereby the diaphragm is moved to permit the first means to open the ports, and means for adjusting the tension on said pressure means whereby the valves may be opened at any predetermined fluid pressure in the chamber.

The drawings illustrate embodiments of the invention and the views therein are as follows:

Figure 1 is a vertical sectional view taken through the center of the pressure chamber, Figure 2 is a top plan view of the body with the diaphragm and all mechanism above the same omitted, and shows the position of the valves in the chamber, Figure 3 is a side view of the by-pass valve, Figure 4 is a bottom plan view of the same, Figure 5 is a side view of the outlet port, Figure 6 is a fragmentary sectional view of a bellows diaphragm which may be used as a substitute for the plate diaphragm shown in Figure 1, Figure 7 is a modified form of my device showing separate pressure means above each of the valves, and Figure 8 is a cross-sectional view taken on the line 8—8 of Figure 7 and looking in the direction of the arrows.

The control device illustrated is particularly adaptable to oil burners wherein oil is pumped from a storage tank through the inlet opening and to the pressure chamber from which only a portion is drawn for the burner and the balance is by-passed back to the storage tank.

The fluid control device has a body 11 which is substantially circular in shape and is provided with a circular pressure chamber 12 at the upper end of the same. The lower end of the body is provided with bosses 13 and 14 in which are tapped holes 16 and 17 for receiving pipes leading to the burner and to the storage tank, respectively.

The bosses 13 and 14 are shown on the drawings as diametrically opposite while at right angles thereto and diametrically opposite is a boss 18 for connection with a pressure gauge while the boss 19 has swivel means 21 which has thereon a boss 22 which is internally threaded for receiving a pipe from the pressure pump (not shown).

The upper end of the body is provided with an annular flange 23 for receiving the bolts 24 which fasten the head 26 onto said body.

Extending up into the pressure chamber 12 is the boss 27 which is cut away to provide two valve sleeves 28 and 29.

At the bottom of the openings 31 and 32, respectively in said sleeves, are the ports 33 and 34 which make a right angular bend and communicate respectively with the tapped holes 16 and 17 in the bosses 13 and 14.

Fitting within the circular openings 31 and 32 are valves 36 and 37, respectively. These valves are shown in detail in Figures 3, 4 and 5 and the valve 36 has its stem triangular in shape and a pyramidal point 38 whose taper is 60°. This pyramidal point fits into the seat of the port 33 and closes the same when the valve is in its lowermost position.

The valve 37 which fits in the circular opening 32 is likewise triangular in section, as shown in Figure 4, and has its bottom cut into pyramidal shape with the walls 39 thereof tapering at an angle of 45°.

The length between the pyramidal apex of the valve 37 and the collar 41 beneath the head 42 thereof is slightly longer than the pyramidal point of the valve 36 and the bottom of the collar 43 beneath the head 44 thereof.

A spiral spring 46 surrounds each of the sleeves 28 and 29 resting on the material of the boss 27 at their lower ends and engaging the underface of the heads 42 and 44 of the valve stems and encircling respectively the collars 41 and 43 thereon.

When the valves are in the position shown in Figure 1 these springs exert an upward pressure on the valves and tend to raise the same from the seats of their respective ports so as to open said ports.

Completely covering the pressure chamber 12 and held firmly thereon by means of the flange 47 of the head 26 is a diaphragm 48. This diaphragm is preferably made of thin metal and is capable of being buckled by pressure within the chamber.

The head 26 is provided with a central cup part 49 which is bored out at its lower end to provide the annular shoulder 51. In this bore there is a pressure plate 52 which rests at all times on the upper surface of the diaphragm 48 while the spiral spring 53 extends from the upper face of said pressure plate to a pressure plate 54 whose distance from the end wall of the cup is regulated by means of a screw 56 which may be turned to increase or decrease the pressure on said spring.

A cap 57 is threaded over the top of the screw to prevent accidental turning thereof and to prevent the accumulation of dirt or foreign substances thereon and also to prevent leakage of oil if for any reason the diaphragm should break.

It has been heretofore suggested that the valve stem 36 is slightly shorter than the valve stem 37 and by reference to Figure 1, where the control device is shown without any pressure in the chamber 12, the diaphragm 48 is shown as extending downward slightly onto the head 42 by the action of the spring 53 above the same.

When sufficient pressure fluid is admitted to chamber 12, the top of the longer stem valve 37 operates as a fulcrum for the distorted flexible diaphragm, and that part of the diaphragm which overlies the valve 36 is raised to restore the pressure plate 52 to its normal horizontal position, and this movement relieves the pressure valve 36, which is thus opened by the spring 29 before the valve 37 leaves its seat.

For the purpose of illustrating the operation of the device in connection with an oil burner, let us assume that the pressure in the chamber 12 required to overcome the tension of the spring 53 is 80 pounds per square inch.

This, of course, is the pressure which, added to the pressure of the springs 46, will permit the valve 37 to unseat itself and permit the flow of oil through the by-pass port 34 which communicates with the supply tank.

It has been found by experiment that the pressure in the chamber 12 required to straighten out the diaphragm from the position there shown is 40 pounds per square inch less than the pressure required to overcome the tension of the spring 53. Therefore, when the pressure of the fluid in the chamber 12 reaches 40 pounds per square inch, the diaphragm will straighten out and as the valve stem 36 is about .009 inch shorter than the stem of the valve 37, the spring engaging the head 44 of the valve 36 will raise the same, thereby permitting oil to flow through the port 33 to the burner.

The amount of oil taken through this port will of course be insufficient to materially affect the pressure which is being built up in the pressure chamber by the pump and therefore the pressure in the chamber will continue to increase until it becomes sufficient to overcome the tension on the spring 53, at which time it will buckle the diaphragm 48, thereby permitting the spring 46 which engages with the head 42 of the valve 37 to raise the said valve and open the by-pass port 34, which permits oil from the pressure chamber to return to the supply tank.

It will, of course, be understood that only sufficient oil passes down through the port 33 and into the burner as the restricted orifice in the burner will take. Therefore, when the valve 37 is opened, a much greater amount of oil will flow through the port 34 and back to the supply tank.

If, however, for any reason the pressure decreases in the pressure chamber the tension of the spring 53 on the diaphragm 48 will close the by-pass port 34 through the action of the valve 37 but this is a condition which is unlikely to arise.

In case the pump is shut down the pressure in the pressure chamber will immediately decrease until the tension of the spring 53 is sufficient to overcome the same, whereby the valve 37 will be returned to its seat in the by-pass port 34 and the valve 36 will be returned to its seat in the supply port 33 but at this point the pressure would ordinarily reduce no further so that the valve 36 is barely closing the port 33 without being pressed firmly on its seat.

To overcome this ordinary sustained pressure in the pressure chamber there is provided on the pyramidal portion 39 of the valve stem 37 a small passageway 58 which permits a small quantity of the oil in the chamber to pass down through the by-pass port 34, thus relieving the pressure in the said chamber and permitting the tension spring 53 returning the diaphragm to the position above the valve 36, as shown in Figure 1.

Figure 6 illustrates a bellows diaphragm which may be substituted in the structure just described in place of the diaphragm 48 therein. This may sometimes be used where a greater range of flexibility is desired.

In Figures 7 and 8 the modified form shows in like manner a single diaphragm 61 and two tension plates 62 and 63 which are immediately above the valve heads 64 and 66, respectively.

The tension plates are each provided with a tension spring 67 and 68 respectively and the tension on the spring 67 will be less than the tension on the spring 68 so that the combined pressure of the fluid in the pressure chamber 69, coupled with the upward pressure of the spring 71, will operate the part of the diaphragm immediately above this valve at about 40 pounds per square inch pressure, less than it will take to overcome the pressure of the spring 68 so as to operate the by-pass valve.

With a diaphragm of this type it will be unnecessary to make one valve stem shorter than the other but, as in the case of the valves 36 and 37, the pyramidal ends of the valves will be of different tapers, as formerly explained.

By the use of the modified form shown in Figure 6, the operation of the valves governing the outlet and by-pass ports may be set at a nicety by means of the screws 72 and 73.

Of course, the fluid control device illustrated herein may be modified in various ways without departing from the invention herein set forth and hereafter claimed.

The invention is hereby claimed as follows:

1. A fluid control device comprising a body having a pressure chamber, an inlet port, an outlet port and a by-pass port, valves controlling said outlet and by-pass ports, means for normally urging said valves into position to open said ports, a flexible diaphragm engaging said valves, and pressure means beyond said diaphragm for overcoming the pressure of the first means and normally holding the valves in position closing said ports.

2. A fluid control device comprising a body having a pressure chamber, an inlet port, an outlet port and a by-pass port, valves controlling said outlet and by-pass ports, means for normally urging said valves into position to open said ports, a flexible diaphragm engaging said valves, pressure means beyond said diaphragm for overcoming the pressure of the first means and normally holding the valves in position closing said ports, and means for adjusting the tension on said pressure means.

3. A fluid control device comprising a body having a pressure chamber, a port for the admission of fluid under pressure to said chamber, an outlet port and a by-pass port for returning excess liquid, a valve in the outlet port and a valve in the by-pass port, each valve having a stem, means for normally urging said valves into position to open said ports, a flexible diaphragm engaging said valves, and pressure means for holding said diaphragm against said valve stems to keep the valves closed, said pressure means being adapted to be overcome by the pressure of the fluid in the chamber whereby the diaphagm is moved to permit the first means to open the ports.

4. A fluid control device comprising a body having a pressure chamber, a port for the admission of fluid under pressure to said chamber, an outlet port and a by-pass port for returning excess liquid, a valve in the outlet port and a valve in the by-pass port, each valve having a stem, means for normally urging said valves into position to open said ports, a flexible diaphragm engaging said valves, means for holding said diaphragm against said valve stems to keep the valves closed, said pressure means being adapted to be overcome by the pressure of the fluid in the chamber whereby the diaphragm is moved to permit the first means to open the ports, and means for adjusting the tension on said pressure means whereby the valves may be opened at any predetermined fluid pressure in the chamber.

5. A fluid control device comprising a body having a pressure chamber, a port for the admission of fluid under pressure to said chamber, an outlet port and a by-pass port for returning excess liquid, a valve in the outlet port and a valve in the by-pass port, and single flexible diaphragm means for containing both of said ports to permit the fluid to be passed through the outlet port and the excess return to the source.

6. A control valve for oil burners comprising a body having an oil pressure chamber, a port for the admission of fluid under pressure from a supply tank, a port for the burner and a by-pass port for returning excess liquid to the supply tank, a valve in the burner port and a valve in the by-pass port, and single flexible diaphragm means controlling said valves whereby the oil is admitted to the burner port and the excess returned to the supply tank.

7. A control valve for oil burners comprising a body having an oil pressure chamber, a port for the admission of fluid under pressure from a supply tank, a port for the burner and a by-pass port for returning excess liquid to the supply tank, a valve in the burner port and a valve in the by-pass port, a single flexible diaphragm adjacent said valves, means for exerting pressure on the side of said diaphragm opposite said valves, and means on said valves for opening said ports when the pressure in the pressure chamber is sufficient to overcome the pressure of the pressure means on the side of said diaphragm opposite said valves.

8. A control valve for oil burners comprising a body having an oil pressure chamber, a port for the admission of fluid under pressure from a supply tank, a port for the burner and a by-pass port for returning excess liquid to the supply tank, a valve in the burner port and a valve in the by-pass port, the valve in the burner port being slightly shorter than the valve in the by-pass port, a single flexible diaphragm engaging the heads of said valves through pressure means on the opposite side thereof, said diaphragm being slightly distorted by reason of the difference in lengths between said valve stems, said burner valve being adapted to open when the pressure of the fluid in said pressure chamber is sufficient to straighten said diaphragm, thereby permitting oil to flow to the burner, said diaphragm being adapted to be buckled upward so as to permit the further opening of the burner port and the opening of the by-pass port when the pressure in the pressure chamber has been built up so as to entirely overcome the pressure means on the other side of said diaphragm.

9. In a valve having ports for the admission, release and by-pass of liquid, a valve in each of said release and by-pass ports for opening and closing same, means normally urging said valves into open position, and a single flexible diaphragm for controlling the movements of both valves.

10. In a valve having ports for the admission, release and by-pass of liquid, a valve in each of said release and by-pass ports for opening and closing same, means normally urging said valves into open position, and a single flexible diaphragm governed by pressures for controlling the movements of both valves.

11. In a valve having ports for admission, release and by-pass of liquid, a valve in each of said release and by-pass ports, means normally tending to unseat said valves, and a single diaphragm controlling said valves whereby the release valve is unseated in advance of the by-pass valve.

12. In a valve having ports for admission, release and by-pass of liquid, a valve in each of said release and by-pass ports, means normally tending to unseat said valves, and a single diaphragm governed by the pressure of the fluid for controlling said valves whereby the release valve is unseated in advance of the by-pass valve.

13. In a valve having ports for admission, release and by-pass of liquid, a valve in each of said release and by-pass ports, said by-pass valve having a longer stem than the stem of the release valve, means normally tending to unseat said valves, and a single diaphragm controlling said valves whereby the release valve is unseated in advance of the by-pass valve.

14. In a valve having ports for admission, release and by-pass of liquid, a valve in each of said release and by-pass ports, said by-pass valve having a longer stem than the stem of the release valve, means normally tending to unseat said valves, and a single diaphragm governed by the pressure of the fluid for controlling said valves whereby the release valve is unseated in advance of the by-pass valve.

In testimony whereof we have signed our names to this specification.

THOMAS W. MURPHY.
WLADYSLAW CZARNECKI.

CERTIFICATE OF CORRECTION.

Patent No. 1,841,140.  Granted January 12, 1932, to

THOMAS W. MURPHY ET AL.

It is hereby certified that error appears in the printed specification of the above numbered patent requiring correction as follows: Page 3, lines 116 and 117, claim 5, for "containing" read controlling, and line 119, same claim, for "return" read returned; and that the said Letters Patent should be read with these corrections therein that the same may conform to the record of the case in the Patent Office.

Signed and sealed this 5th day of April, A. D. 1932.

(Seal)

M. J. Moore,
Acting Commissioner of Patents.